United States Patent [19]

Spetz

[11] 3,793,647

[45] Feb. 26, 1974

[54] PRE-CONSTRUCTED BUTTONHOLE AND METHOD OF INCORPORATING SAME IN A GARMENT

[76] Inventor: Mary Ann Spetz, 5675 Farcier Ct., Utica, Mich. 48087

[22] Filed: Aug. 2, 1972

[21] Appl. No.: 271,559

Related U.S. Application Data

[63] Continuation-in-part of Ser. No. 141,293, May 7, 1971, Pat. No. 3,701,167.

[52] U.S. Cl. .................................................. 2/266
[51] Int. Cl. .............................................. A41f 1/02
[58] Field of Search ................. 2/266, 243; 112/264

[56] References Cited
UNITED STATES PATENTS

| | | | |
|---|---|---|---|
| 3,536,554 | 10/1970 | Weiss | 2/266 X |
| 3,547,060 | 12/1970 | Lepore | 2/266 X |
| 3,587,501 | 6/1971 | Cruden | 2/266 X |
| 3,701,167 | 10/1972 | Spetz | 2/266 |
| 3,703,149 | 11/1972 | George | 2/266 X |

Primary Examiner—Alfred R. Guest
Attorney, Agent, or Firm—Weiner, Basile and Weintraub

[57] ABSTRACT

A pre-constructed buttonhole consisting of components independent of an article to which they are to be attached, and a method for incorporating the components into a material to form a finished buttonhole. The components consist of a reinforcing piece disposed on the surface opposite the exterior finished surface of the article, and buttonhole piece assembly comprised of buttonhole pieces having tab-portions disposed on the finished surface of the article. A slit is made which extends through the reinforcing piece and layers of material composing the article. The tab portions of the buttonhole pieces, which comprise the buttonhole piece assembly, are inserted through this slit to the exterior finished surface of the article and affixed thereto to form a buttonhole.

13 Claims, 9 Drawing Figures

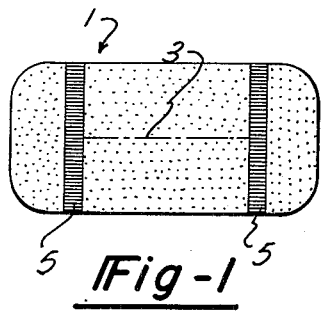
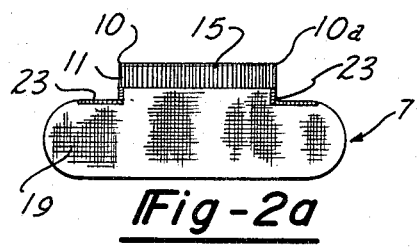
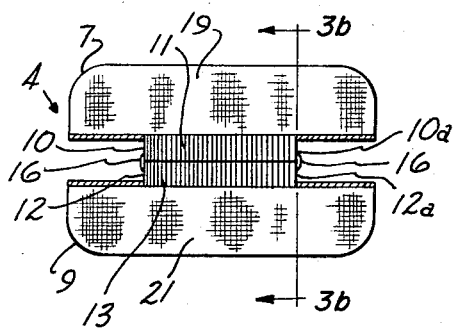
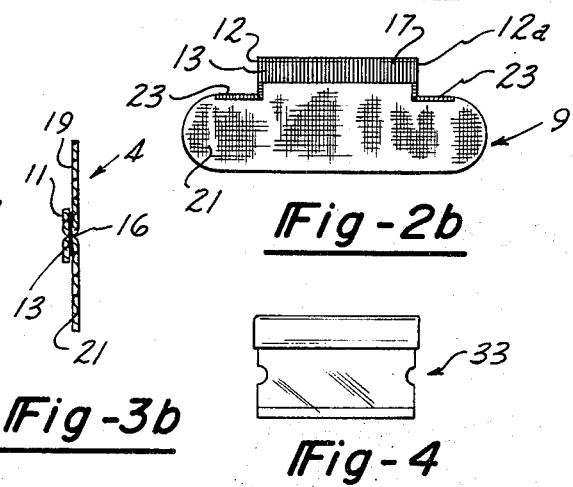
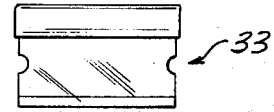
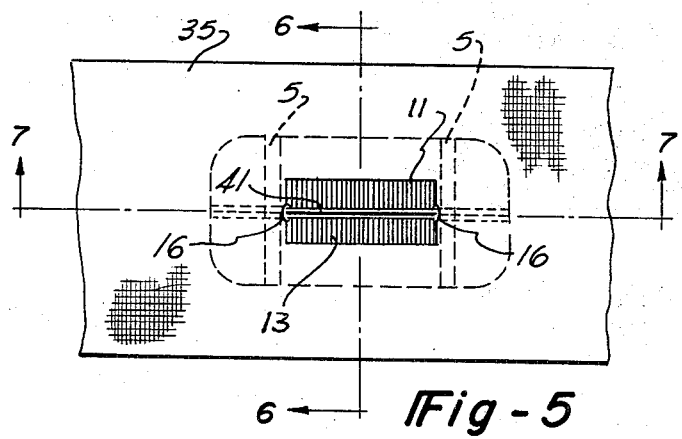
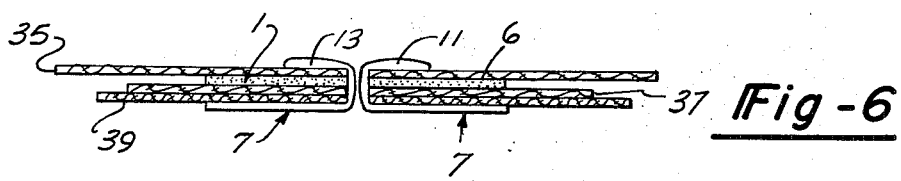
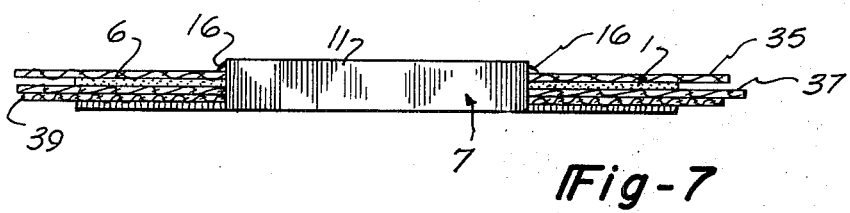

3,793,647

PRE-CONSTRUCTED BUTTONHOLE AND METHOD OF INCORPORATING SAME IN A GARMENT

CROSS-REFERENCE TO RELATED APPLICATIONS

This is a continuation-in-part of application Ser. No. 141,293 filed May 7, 1971 and now U.S. Pat. No. 3,701,167.

BACKGROUND OF THE INVENTION

1. Field of the Invention

The present invention pertains to the field of art encompassing making an opening in a material for decorative or functional purposes, especially that part of the field pertaining to making buttonholes in wearing apparel. The present invention may be used to make decorative and/or functional buttonholes in any material capable of being slit 2. Description of Prior Art There are prior art methods and devices for making simplified buttonholes, such as attachments for sewing machines, special dies used to emboss buttonhole forms, and various methods utilizing patches of fabric sewn or bounded to the material in which a buttonhole is to be placed, all of which require varying degrees of skill and dexterity of manipulation. No prior art method or device is capable of doing what the present invention can do, viz., to make a professional appearing "worked" type buttonhole without the use of a sewing machine attachment or special equipment, adaptable to any material from which a garment can be made, and installable in areas where it has been heretofore impossible to install durable buttonholes.

SUMMARY OF THE INVENTION

The present invention provides a pre-constructed buttonhole for installation in a material, such as wearing apparel, including a buttonhole reinforcement piece adapted to be affixed to the material such that it will not be visible from the exposed surface of the material. The reinforcing piece has a cutting guide line adapted to aid in making uniform buttonhole slits in the material. A buttonhole piece assembly comprised of substantially identical buttonhole pieces having tab portions adapted to pass through the buttonhole slit are themselves adapted to be affixed to the material.

The present invention also provides a buttonhole attached to a material, such as wearing apparel, including a buttonhole reinforcement piece located in a selected area of the material such that it is not visible from the exterior finished surface of the material, and a buttonhole piece assembly comprised of at least one buttonhole piece with tab portions also located on the material such that it is not visible from the exterior finished surface of the material except for the tab portions which extend through the buttonhole slit and are affixed to the exterior finished surface of the material.

In addition, the present invention provides a pre-constructed buttonhole for installation in a material comprising a buttonhole piece assembly with tab portions. The buttonhole piece assembly being adapted to be affixed to the material such that it will not be visible from the exterior finished surface of the material except for any tab portion which extends through the buttonhole slit and is affixed to the exterior finished surface of the material.

The present invention also provides a method for installing a pre-constructed buttonhole in a material such as wearing apparel. The method includes the steps of placing a buttonhole reinforcement piece on the material such that it is not visible from the exterior finished surface of the material and affixing it to the material by applying heat to a heat activated adhesive. Then, using a pre-measured cutter, a slit is cut through the buttonhole reinforcement and material. Next, any interfacing and facing material that is used is placed in juxtaposition over the material to which the buttonhole reinforcement piece is affixed. A slit, aligned with the previously made slit through the buttonhole reinforcement piece, is cut with the pre-measured cutting instrument through the interfacing and facing material. The tab portions of the buttonhole piece assembly are then inserted through the slit and folded over on the exterior front surface of the material. Heat is next applied to fix the buttonhole piece assembly in place on the exterior and interior finished surfaces of the article, encompassing any and all layers of material between the tab portions and the main body of the buttonhole piece assembly.

BRIEF DESCRIPTION OF THE DRAWINGS

FIG. 1 is a top view of the reinforcement piece or first component according to one possible embodiment of the present invention.

FIGS. 2A and 2B are top views of substantially identical buttonhole pieces or second and third components which comprise the buttonhole piece assembly according to one possible embodiment of the present invention.

FIG. 3A is a top view of the buttonhole piece assembly comprised of the buttonhole pieces shown in FIGS. 2A and 2B.

FIG. 3B is a sectional view of the buttonhole piece assembly, taken along line 3B—3B of FIG. 3A.

FIG. 4 is a side view of the pre-measured cutting blade according to one possible embodiment of the present invention.

FIG. 5 is a top view of one possible embodiment of the present invention installed in a portion of material.

FIG. 6 is a sectional view, taken along line 6—6 of FIG. 5, of the present invention installed in a portion of material.

FIG. 7 is a sectional view, taken along line 7—7 of FIG. 5, of the present invention installed in a portion of material.

DESCRIPTION OF SOME PREFERRED EMBODIMENTS

With reference to the FIG. 1, there is shown one embodiment of the first component or reinforcement piece 1. This first component 1 is constructed of a substance suitable for the material on which it is to be installed. Disposed on the first component 1 is a buttonhole cutting guideline 3 to aid in cutting a buttonhole slit, and a plurality of stitches 5 which define the length of the buttonhole slit and act as reinforcements. Disposed on the surface opposite the cutting guideline 3 is a heat-activated adhesive 6 (see FIGS. 6 and 7).

FIGS. 2A and 2B illustrate an embodiment of substantially identical second and third components or buttonhole pieces 7 and 9, respectively. These components 7 and 9 are constructed of a substance suitable for the material on which they are to be installed. Located on the components 7 and 9 are tab portions 11 and 13 of a depth appropriate for the thickness of the material on which they are to be placed, and to allow the tab portions 11 and 13 to extend through the material and to be folded on the outside surface of the material. Close stitching 15 and 17 of a thread suitable in weight and color for the intended application is located along the tab portions 11 and 13, respectively. Disposed on one surface of the components 7 and 9 is a heat-activated adhesive 19 and 21 respectively.

If desired, the land portions 23 adjacent the tab portions 11 and 13 of the buttonhole pieces 7 and 9 may be finished with a stitching. The stitching 15 and 17 may be made from the same continuous thread used for the land portions 23 to keep the ends of the stitching 15 and 17 from falling off the tab ends.

With reference to FIGS. 3A and 3B, there is shown one embodiment of a buttonhole piece assembly, generally denoted as numeral 4, which is comprised of at least two buttonhole pieces 7, 9. The tab portions 11 and 13 are in approximate juxtaposition with one another, and are folded in opposite directions relative to each other, generally toward the surface of the buttonhole pieces upon which is disposed the heat-activated adhesive 19 and 21, respectively.

The ends of the tab portion 11 are generally denoted as numerals 10 and 10a, while the ends of the tab portion 13 are generally denoted as 12 and 12a. End 10 of tab portion 11 and end 12 of tab portion 13 are fastened together, and end 10a of tab portion 11 and end 12a of tab portion 13 are fastened together. The fastening means by which the tab portions 11 and 13 are fastened together may take the form of tacking or stitching 16 with a thread of suitable weight and color.

Illustrated in FIG. 4 is a pre-measured cutting blade 33 which may be used in making a slit in the material and in the first component 1. The blade 33 is the same length as the cutting guideline 3 (see FIG. 1).

Referring now to FIGS. 5, 6 and 7, one form of a buttonhole construction of the present invention formed in a material or garment piece 35 is shown. Insofar as the material in which the buttonhole is to be installed is concerned, it is understood that the buttonhole may be installed in any material of varying thickness or plurality of layers. In the description of the method to follow reference will be made to a plurality of layers. However, the present invention and method may be employed with a single layer of material.

As shown on FIGS. 5, 6 and 7, a material or outside garment piece is indicated at 35. The first component 1 and the buttonhole piece assembly 4 which is composed of second and third components 7 and 9 are disposed in a concealed relationship to the outside surface of the garment piece 35 except for the tab portions 11 and 13 which protrude through and are affixed to the other surface of the garment piece 35.

As illustrated in FIGS. 6 and 7, the material in which the buttonhole is to be installed includes a garment piece 35, interfacing material 37, and a facing material 39. In the installation of the pre-constructed buttonhole of the present invention, the first component 1 is secured to the garment piece 35 such that it will not be visible from the outside surface making sure the side on which is disposed the adhesive 6 is in juxtaposition to the garment piece 35. Heat is applied to the first component 1 to the garment piece 35. Care should be taken when applying the heat to avoid scorching.

The pre-measured cutting blade 33 (see FIG. 4) is placed on the cutting guideline 3 (see FIG. 1) and struck on the top with a hammer or other suitable object, thus making a slit 41 (see FIG. 5) through the first component 1 and the garment piece 35. Care should be exercised to avoid cutting the stitches 5 (see FIG. 1).

At this point, if interfacing and facing materials 37 and 39 are being used in the making a new garment, the construction of the garment should go to completion prior to taking the subsequent steps of installing the buttonhole.

The interfacing material 37 and the facing material 39 are next placed smoothly in place over the first component 1 and the garment piece 35, and temporarily pinned to the garment piece 35 to assure that there is no relative movement between them during the succeeding steps to be taken.

The cutting blade 33 (see FIG. 4) is placed into the previously made slit 41 (see FIG. 5) from the outside surface of the garment piece 35 and again struck on the top with a hammer to drive it through the interfacing material 37 and the facing material 39.

Next, tab portions 11 and 13 of the buttonhole piece assembly 4 are inserted through the slit 41 and protrude from the outside surface of the garment piece 35.

The protruding tab portions 11 and 13 are folded in opposite directions to each other on the outside surface of the garment piece 35 as shown in FIGS. 5 and 6. Similarly, the portions of the assembly 4 which protruded from the facing material 39 are folded in opposite directions to each other.

Heat is next applied to either the outside surface of the garment piece 35 or the exposed surface of the facing material 39 to secure the tab portions 11 and 13 and the folded portions of the buttonhole piece assembly 4 in place. Care should be exercised to avoid scorching.

If the pre-constructed buttonhole is installed in a material 35 with a nap, such as corduroy, velvet, velveteen, or a rough material, such as terrycloth, or a thick fabric it may be desirable to sew around the periphery of the exposed tab portions 11 and 13 through the entire thickness of material or garment to assure proper installation.

Various modifications such as different shapes of the components 1, 7 and 9; tab portions 11 and 13 as well as slight changes in the installation procedure, such as replacing the pre-measured cutting edge blade 33 with a cutting instrument of any dimension, will occur to those skilled to the art and are within the scope of the present invention and the appended claims, and it is to be understood that the invention, in relating to preferred embodiments, is for the purpose of illustration only. All modifications which relate to the spirit of the invention are intended to be included within the scope of the appended claims.

I claim:

1. A pre-constructed buttonhole device which is adapted to be secured to a material, comprising in combination:

a first component which is adapted to be secured to a surface of said material;

second and third components, each of which is provided with a tab portion;

means for fastening said second component to said third component at spaced locations on said tab means to form an assembly;

said assembly being adapted to be affixed to said material; and each of said tab portions being adapted to pass through means defining a slit to be made in said material and said first component, and adapted to be affixed to said material.

2. A pre-constructed buttonhole device according to claim 1, wherein:

a heat-activated adhesive is disposed on one surface of said first component to act as a bonding agent between said first component and said material; and a heat-activated adhesive is disposed on one surface of each of said second and third components which comprise said assembly to act as a bonding agent between said assembly and said material.

3. A pre-constructed buttonhole device according to claim 2, wherein:

a visible buttonhole cutting guideline is disposed on said first component.

4. A pre-constructed buttonhole device according to claim 3, wherein:

said tab portions of said second and third components are shorter than said cutting guide line on said first component.

5. A pre-constructed buttonhole device according to claim 3, wherein:

a plurality of spaced apart stitches on said first component define the buttonhole length and act as reinforcements for the buttonhole.

6. A pre-constructed buttonhole device according to claim 5, wherein:

said tab portions of said second and third components are shorter than said cutting guide line on said first component.

7. A pre-constructed buttonhole device according to claim 2, wherein:

said fastening means is tacking.

8. A pre-constructed buttonhole device according to claim 7, wherein:

said tacking is disposed at the ends of said tab portions to fasten the ends of said tab portion of said second component to the ends of said tab portion of said third component adjacent them, respectively.

9. A pre-constructed buttonhole device which is adapted to be secured to a material, to form a buttonhole in said material, said device comprising:

a buttonhole piece assembly comprised of buttonhole pieces which are substantially identical to each other, and each of which buttonhole pieces is provided with a tab portion having a width no wider than the width of the means defining said buttonhole;

means for fastening said buttonhole pieces together, said buttonhole piece assembly being adapted to be secured to said material; and said tab portions being adapted to pass through means defining a slit made in said material and being adapted to be affixed to said material.

10. A pre-constructed buttonhole device according to claim 9, wherein:

said fastening means is tacking; and said tacking is disposed at the ends of said tab portions to fasten the ends of said tab portion of one of said buttonhole pieces to the ends of said tab portion of the other of said buttonhole pieces adjacent them, respectively.

11. A method of installing a pre-constructed buttonhole in a material, which comprises the steps of:

locating a first component in a concealed relationship to the outside surface of a first layer of said material;

applying heat to activate a heat-activated adhesive applied to said first component to bond said first component in place;

cutting a slit the length of the buttonhole through said first component;

inserting tab portions of a buttonhole assembly through said slit in a manner such that said tab portions protrude from the outside surface of said first layer of said material;

folding said protruding tab portions of said assembly in opposite relationship to each other;

folding the portion of said assembly which protrude from the surface opposite said outside surface of said first layer of material in opposite relationship to each other; and applying heat-activated adhesive applied to said assembly to bond said assembly in place.

12. A method of installing a pre-constructed buttonhole in a material substantially as set forth in claim 11 wherein said step of cutting a slit the length of the buttonhole in said first component is further characterized by:

cutting a slit the length of the buttonhole through said first component and through said first layer of material.

13. A method of installing a pre-constructed buttonhole in a material substantially as set forth in claim 12, further characterized by the additional steps, immediately following said step of claim 12, of:

placing interfacing and facing material to proper relationship to said first layer of material and affixing them thereto in a temporary manner; and cutting a slit the length of the buttonhole through said interfacing and through said facing material aligned with said slit in said first layer of material and said first component.

* * * * *